United States Patent
Kim et al.

(10) Patent No.: US 10,361,469 B2
(45) Date of Patent: Jul. 23, 2019

(54) BATTERY MODULE HAVING WATER-COOLED TYPE COOLING STRUCTURE

(71) Applicant: LG CHEM, LTD., Seoul (KR)

(72) Inventors: Tae Hyuck Kim, Daejeon (KR); Tae Hwan Roh, Daejeon (KR); Yoonhee Lee, Daejeon (KR); Jin Kyu Lee, Daejeon (KR); Junhee Jung, Daejeon (KR)

(73) Assignee: LG Chem, Ltd., Seoul (KR)

( * ) Notice: Subject to any disclaimer, the term of this patent is extended or adjusted under 35 U.S.C. 154(b) by 120 days.

(21) Appl. No.: 15/313,397

(22) PCT Filed: May 18, 2015

(86) PCT No.: PCT/KR2015/004935
§ 371 (c)(1),
(2) Date: Nov. 22, 2016

(87) PCT Pub. No.: WO2015/182909
PCT Pub. Date: Dec. 3, 2015

(65) Prior Publication Data
US 2017/0194681 A1    Jul. 6, 2017

(30) Foreign Application Priority Data
May 29, 2014 (KR) .......................... 10-2014-0064823

(51) Int. Cl.
*H01M 10/6568* (2014.01)
*H01M 10/6555* (2014.01)
(Continued)

(52) U.S. Cl.
CPC ..... *H01M 10/6568* (2015.04); *H01M 2/1077* (2013.01); *H01M 2/1094* (2013.01);
(Continued)

(58) Field of Classification Search
CPC ........... H01M 10/647; H01M 10/6568; H01M 10/6555; H01M 2/1077; H01M 2/1094; H01M 2010/4271
See application file for complete search history.

(56) References Cited

U.S. PATENT DOCUMENTS

| 8,323,819 B2 | 12/2012 | Lee et al. |
| 9,023,508 B2 | 5/2015 | Seong et al. |

(Continued)

FOREIGN PATENT DOCUMENTS

| JP | 2005-209365 A | 8/2005 |
| JP | 2012-527082 A | 11/2012 |

(Continued)

OTHER PUBLICATIONS

International Search Report and Written Opinion for Application No. PCT/KR2015/004935, dated Aug. 4, 2015.
(Continued)

*Primary Examiner* — Osei K Amponsah
(74) *Attorney, Agent, or Firm* — Morgan, Lewis & Bockius LLP

(57) ABSTRACT

Disclosed herein is a battery module including a battery cell assembly having battery cells laterally arranged, a front plate and a rear plate fixed to outermost battery cells, an electrically insulative cover member mounted at an upper end of the battery cell assembly, the cover member being provided with through holes, through which electrode terminals of the battery cells extend, conductive connection parts arranged in a state in which the conductive connection parts are mounted at the cover member, the conductive connection parts being connected to the electrode terminals for detecting voltages of the battery cells while achieving electrical connection between the battery cells, cooling members interposed between the battery cells, each of the cooling members being provided with a coolant flow part having a hollow structure, (Continued)

in which a coolant flows, and a manifold connected to the cooling members for moving the coolant in the coolant flow part.

23 Claims, 3 Drawing Sheets

(51) Int. Cl.
| | |
|---|---|
| *H01M 10/647* | (2014.01) |
| *H01M 2/10* | (2006.01) |
| *H01M 10/6552* | (2014.01) |
| *H01M 10/655* | (2014.01) |
| *H01M 2/20* | (2006.01) |
| *H01M 10/625* | (2014.01) |
| *H01M 10/6556* | (2014.01) |
| *H01M 10/6567* | (2014.01) |
| *H01M 10/613* | (2014.01) |
| *H01M 10/42* | (2006.01) |

(52) U.S. Cl.
CPC ......... *H01M 2/206* (2013.01); *H01M 10/613* (2015.04); *H01M 10/625* (2015.04); *H01M 10/647* (2015.04); *H01M 10/655* (2015.04); *H01M 10/6552* (2015.04); *H01M 10/6555* (2015.04); *H01M 10/6556* (2015.04); *H01M 10/6567* (2015.04); *H01M 2010/4271* (2013.01); *H01M 2220/20* (2013.01)

(56) References Cited

U.S. PATENT DOCUMENTS

| | | | | |
|---|---|---|---|---|
| 2004/0258982 | A1* | 12/2004 | Coffey | H01M 2/0232 |
| | | | | 429/94 |
| 2008/0233475 | A1* | 9/2008 | Kozu | H01M 2/1066 |
| | | | | 429/159 |
| 2010/0215998 | A1* | 8/2010 | Byun | H01M 2/1077 |
| | | | | 429/82 |
| 2011/0064985 | A1 | 3/2011 | Lee et al. | |
| 2012/0107664 | A1* | 5/2012 | Lee | H01M 2/1077 |
| | | | | 429/120 |
| 2012/0237805 | A1* | 9/2012 | Abels | H01M 2/1077 |
| | | | | 429/83 |
| 2013/0309531 | A1 | 11/2013 | Chiu | |
| 2014/0234690 | A1 | 8/2014 | Lee et al. | |
| 2014/0335390 | A1 | 11/2014 | Hwang et al. | |

FOREIGN PATENT DOCUMENTS

| | | |
|---|---|---|
| JP | 2013-500570 A | 1/2013 |
| KR | 10-1130043 B1 | 3/2012 |
| KR | 10-2012-0055158 A | 5/2012 |
| KR | 10-2013-0062056 A | 6/2013 |
| KR | 10-2013-0123901 A | 11/2013 |
| WO | 2012/126111 A1 | 9/2012 |
| WO | 2013/103211 A1 | 7/2013 |

OTHER PUBLICATIONS

Translation of Japanese Office Action dated Dec. 3, 2018 from the Japanese Patent Office for counterpart Japanese patent application No. 2016-568853.

* cited by examiner

[FIG. 1]
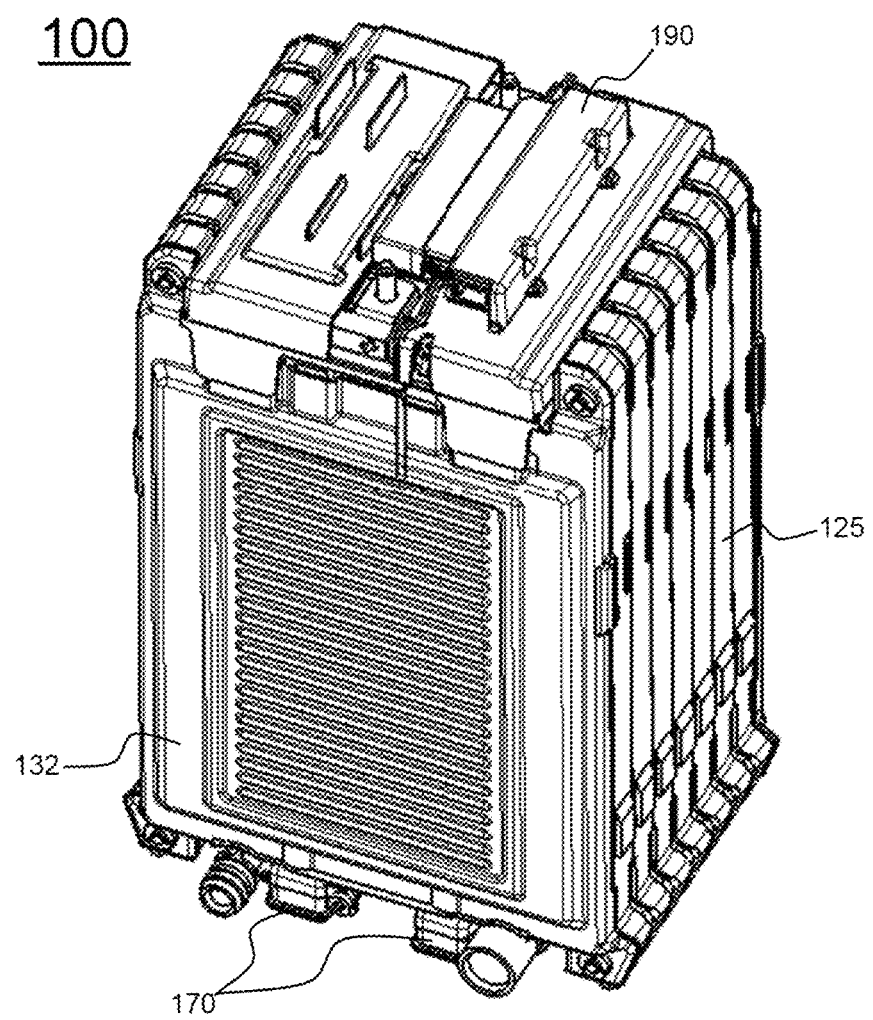

[FIG. 2]
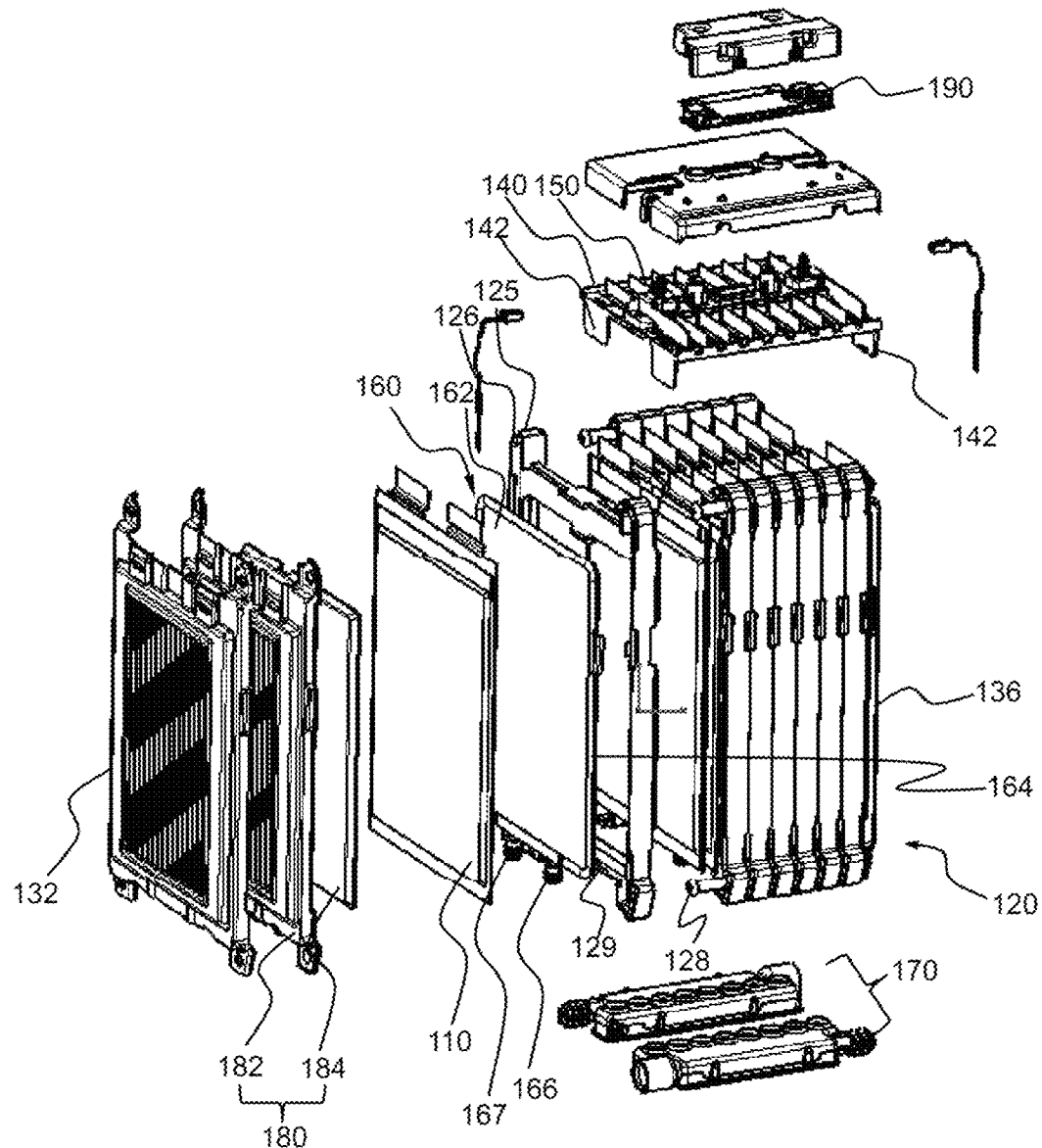

[FIG. 3]
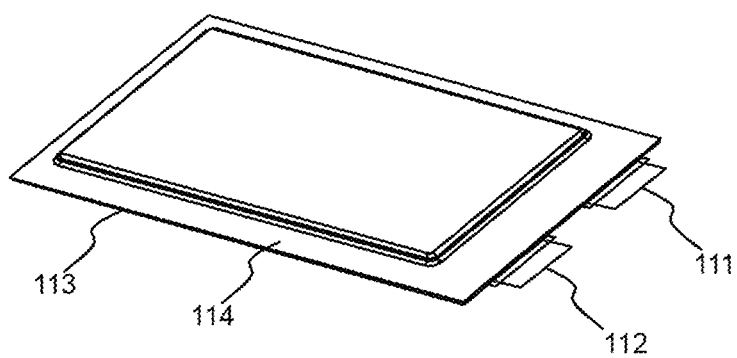

US 10,361,469 B2

BATTERY MODULE HAVING WATER-COOLED TYPE COOLING STRUCTURE

The present application claims priority under 35 U.S.C. § 119 to Korean Patent Application Nos. 10-2014-0064823 filed on May 29, 2014, and under 35 U.S.C. § 365 to PCT/KR2015/004935, filed on May 18, 2015, the disclosures of which are incorporated herein by reference.

TECHNICAL FIELD

The present invention relates to a battery module including a water-cooled type cooling structure.

BACKGROUND ART

In recent years, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to each other because high output and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

Battery cells constituting the middle or large-sized battery module may be secondary batteries which can be charged and discharged. Consequently, a larger amount of heat is generated from such high-output, large-capacity secondary batteries during charge and discharge of the secondary batteries. In particular, the laminate sheet of each pouch-shaped battery widely used in the battery module has a polymer material exhibiting low thermal conductivity coated on the surface thereof with the result that it is difficult to effectively lower overall temperature of the battery cells.

If the heat, generated from the battery module during charge and discharge of the battery module, is not effectively removed from the battery module, the heat accumulates in the battery module with the result that deterioration of the battery module is accelerated. According to circumstances, the battery module may catch fire or explode. For this reason, a middle or large-sized battery pack for vehicles, which is a high-output, large-capacity battery including a plurality of middle or large-sized battery modules, needs a cooling system to cool battery cells mounted therein.

Each battery module mounted in the middle or large-sized battery pack is generally manufactured by stacking a plurality of battery cells with high integration. In this case, the battery cells are stacked in a state in which the battery cells are arranged at predetermined intervals such that heat generated from the battery cells during charge and discharge of the battery cells can be removed. For example, the battery cells may be sequentially stacked in a state in which the battery cells are arranged at predetermined intervals without using an additional member. Alternatively, in a case in which the battery cells have low mechanical strength, one or more battery cells may be mounted in a cartridge to constitute a unit module, and then a plurality of unit modules may be stacked to constitute a battery module. In a case in which the cartridge is used, the mechanical strength of the battery cells is improved; however, the overall size of the battery module is increased.

In addition, coolant channels are defined between the stacked battery cells or between the stacked battery modules such that heat accumulated between the stacked battery cells or between the stacked battery modules can be effectively removed.

Particularly, in a case in which the cooling structure is a water-cooled type cooling structure, a plurality of coolant channels is defined between the battery cells or between the battery modules with the result that it is very difficult to design the cooling structure. In addition, in a case in which a cooling member or a heat conduction member is mounted at a specific region of the battery pack to configure the cooling structure, the overall size of the battery pack is increased.

DISCLOSURE

Technical Problem

Therefore, the present invention has been made to solve the above problems and other technical problems that have yet to be resolved.

It is an object of the present invention to provide a battery module, the volume of which is reduced, the cooling performance of which is improved, and the structural stability of which is improved through efficient configuration of a cooling structure and other components of the battery module.

Technical Solution

In accordance with one aspect of the present invention, the above and other objects can be accomplished by the provision of a battery module including a battery cell assembly having two or more battery cells laterally arranged such that the battery cells tightly contact each other or are adjacent to each other, a front plate and a rear plate fixed to outermost battery cells of the battery cell assembly such that the front plate and the rear plate surround the outermost battery cells of the battery cell assembly, an electrically insulative cover member mounted at an upper end of the battery cell assembly, the cover member being provided with through holes, through which electrode terminals of the battery cells extend, conductive connection parts arranged in a state in which the conductive connection parts are mounted at the cover member, the conductive connection parts being connected to the electrode terminals of the battery cells for detecting voltages of the battery cells while achieving electrical connection between the battery cells, cooling members interposed between the battery cells, each of the cooling members being provided with a coolant flow part having a hollow structure, in which a coolant flows, and a manifold connected to the cooling members for moving the coolant in the coolant flow part.

That is, the cooling structure and other components of the battery module according to the present invention are efficiently configured as described above, whereby the battery module has a compact structure, the cooling performance of the battery module is improved, and the structural stability of the battery module is improved.

Each of the battery cells may be a plate-shaped battery cell, which has a small thickness and a relatively large width and length such that the total size of the battery module is minimized when the battery cells are stacked to constitute the battery module. An example of such a battery cell may be a battery cell configured to have a structure in which an electrode assembly of a positive electrode/separator/negative electrode structure is mounted in a battery receiving unit, and a battery case made of a laminate sheet including a resin layer and a metal layer is sealed by thermal welding such that a sealed portion is formed at the outer edge of the battery case. The battery cell with the above-stated construction may be referred to as a pouch-shaped battery cell.

The battery cell assembly may be configured to have a structure in which cartridges, to each of which a corresponding one of the battery cells is fixed, are stacked while being laterally arranged.

At this time, each of the cartridges may be provided with fastening holes, through which fastening members for fixing the battery cell assembly are inserted. The fastening holes may be formed at the edge of each of the cartridges. The fastening members may be inserted through the fastening holes to fix the structure in which the cartridges are stacked while being laterally arranged.

In addition, for example, each of the cartridges may include a frame for fixing outer edge sealed portions of the battery cells located at opposite sides thereof.

The battery cell assembly may be configured to have a structure in which the battery cells are arranged such that positive electrode terminals and negative electrode terminals of the battery cells protrude upward. When the battery cells are stacked while being laterally arranged, the electrode terminals of the battery cells may be arranged in a direction in which the battery cells are stacked.

The conductive connection parts may be coupled to the cover member in a state in which the conductive connection parts are arranged so as to correspond to the through holes of the cover member. Consequently, the conductive connection parts may be connected to the electrode terminals of the battery cells, which protrude outward through the through holes. The conductive connection parts may be electrically connected to the electrode terminals of the battery cells by welding or mechanical coupling.

The cover member may be provided at the edge thereof with two or more fixing parts extending downward to surround the upper parts of the front plate and the rear plate mounted to the outermost battery cells of the battery cell assembly such that the cover member is stably fixed to the upper end of the battery cell assembly.

Meanwhile, the battery module according to the present invention may further include a battery management system (BMS) for controlling an operation of the battery module. The BMS may be mounted at the top of the cover member.

Materials for each of the cooling members are not particularly restricted so long as each of the cooling members is made of a material exhibiting thermal conductivity. For example, each of the cooling members may be made of a metal material.

Each of the cooling members may be configured to have a structure including a plate-shaped heat dissipation part interposed between the battery cells in a state in which opposite main surfaces of the heat dissipation part is in tight contact with the battery cells, a coolant flow part formed along the outer edge of the heat dissipation part, a coolant inlet port, through which a coolant is introduced, and a coolant outlet port, through which the coolant is discharged.

The coolant inlet port and the coolant outlet port may be formed at one side of the heat dissipation part such that the coolant inlet port and the coolant outlet port are connected to the manifold to introduce and discharge the coolant. Specifically, the coolant inlet port and the coolant outlet port may be formed in a downward direction of the battery cell assembly, and the manifold connected to the cooling members may be mounted at the bottom of the battery cell assembly.

The coolant flowing in the coolant flow part of each of the cooling members may be water. However, the present invention is not limited thereto.

A first battery cell may be mounted to one side of the frame of each of the cartridges in a state in which a corresponding one of the cooling members is interposed between the first battery cell and the frame, a second battery cell may be mounted to the other side of the frame, and the first battery cell and the second battery cell may be disposed in tight contact with opposite main surfaces of the cooling member.

Meanwhile, the frame may be provided with depressed mount parts, in which a coolant inlet port and a coolant outlet port of a corresponding one of the cooling members are mounted. In this structure, the cooling members may be stably fixed at correct positions to perform cooling in a state in which the battery cells, which are fixed by the cartridges, are stacked.

In order to secure insulation between the battery cell assembly or the front plate and the rear plate and to protect the battery cell assembly against external impact, one or more insulating members may be interposed between the outermost battery cells of the battery cell assembly and the front plate and the rear plate.

For example, each of the insulating members may include a first insulating member made of a porous material and a second insulating member made of a sheet material. An example of the porous material constituting the first insulating member may be a foamed resin. However, the present invention is not limited thereto.

Specifically, the first insulating member may contact a corresponding one of the outermost battery cells of the battery cell assembly, and the second insulating member may contact the front plate or the rear plate. The sheet material of the second insulating member may be formed in a shape identical to the inner shape of the front plate or the rear plate.

In accordance with another aspect of the present invention, there is provided a high-output, large-capacity battery pack manufactured using the battery module with the above-stated construction as a unit body. The battery pack may include one or more battery modules mounted in a battery pack case. The battery pack may further include various safety elements, such as a voltage measurement member and a power off member, a cooling system for cooling the entirety of the battery pack, and a member configured to be mounted to an external device.

In accordance with a further aspect of the present invention, there is provided a device including the battery pack with the above-stated construction.

For example, the device may be any one selected from among an electric vehicle, a hybrid electric vehicle, a plug-in hybrid electric vehicle, and a power storage device. However, the present invention is not limited thereto.

The structure and manufacturing method of the device are well known in the art to which the present invention pertains and, therefore, a detailed description thereof will be omitted.

Effects of the Invention

As is apparent from the above description, the cooling structure and other components of the battery module according to the present invention are efficiently configured, whereby the volume of the battery module is reduced, the cooling performance of the battery module is improved, and the structural stability of the battery module is improved.

DESCRIPTION OF DRAWINGS

The above and other objects, features and other advantages of the present invention will be more clearly understood from the following detailed description taken in conjunction with the accompanying drawings, in which:

FIG. 1 is a perspective view showing a battery module according to an embodiment of the present invention;

FIG. 2 is a partially exploded perspective view of the battery module shown in FIG. 1; and FIG. 3 is an enlarged view showing one of the battery cells shown in FIG. 2.

BEST MODE

Now, preferred embodiments of the present invention will be described in detail with reference to the accompanying drawings. It should be noted, however, that the scope of the present invention is not limited by the illustrated embodiments.

FIG. 1 is a perspective view showing a battery module 100 according to an embodiment of the present invention, and FIG. 2 is a partially exploded perspective view of the battery module 100 shown in FIG. 1.

Referring to FIGS. 1 and 2, the battery module 100 is configured to have a structure including a battery cell assembly 120, a front plate 132, a rear plate 136, a cover member 140, conductive connection parts 150, cooling members 160, and a manifold 170.

The battery cell assembly 120 is configured to have a structure in which battery cells 110 are laterally arranged such that the battery cells 110 are adjacent to each other, and the battery cells 110 are laterally stacked in a state in which each of the battery cells 110 is fixed to a cartridge 125. The battery cells 110 are laterally arranged such that electrode terminals of the battery cells 110 protrude upward. The cartridge 125 is configured to have a frame structure for fixing an outer edge sealed portion of a corresponding one of the battery cells 110. The cartridge 125 is provided at an edge thereof with fastening holes 126 for fixing the battery cell assembly 120. That is, fastening members 128 are inserted through the fastening holes 126 to fix a structure in which the cartridges 125 are stacked while being laterally arranged.

The front plate 132 and the rear plate 136, which protect the battery cell assembly 120, are fixed to the outermost battery cells of the battery cell assembly 120 such that the front plate 132 and the rear plate 136 surround the outermost battery cells of the battery cell assembly 120. The front plate 132 and the rear plate 136 are fixed together with the cartridges 125 by the fastening members 128.

The cover member 140 is mounted at the upper end of the battery cell assembly 120. The cover member 140 is provided with through holes, through which electrode terminals 111 and 112 of the battery cells 110 extend. The cover member 140 is provided at an edge thereof with a plurality of fixing parts 142 extending downward to surround the upper part of the front plate 132 and the upper part of the rear plate 136 such that the cover member 140 is stably fixed to the upper end of the battery cell assembly 120.

The conductive connection parts 150 are coupled to the cover member 140 in a state in which the conductive connection parts 150 are arranged so as to correspond to the through holes of the cover member 140. The conductive connection parts 150 are coupled to the electrode terminals 111 and 112 of the battery cells 110, which protrude outward through the through holes, such that the conductive connection parts 150 are electrically connected to the electrode terminals 111 and 112 of the battery cells 110. The conductive connection parts 150 detect voltages of the battery cells 110 while achieving electrical connection between the battery cells 110.

Each of the cooling members 160 is configured to have a structure including a plate-shaped heat dissipation part 162 interposed between the battery cells 110 in a state in which opposite main surfaces of the heat dissipation part 162 is in tight contact with the battery cells 110, a coolant flow part 164 formed along an outer edge of the heat dissipation part 162, a coolant inlet port 166, through which a coolant is introduced, and a coolant outlet port 167, through which the coolant is discharged.

The coolant inlet port 166 and the coolant outlet port 167 of the cooling member 160 are connected to the manifold 170. The coolant inlet port 166 and the coolant outlet port 167 are formed at the lower end of the heat dissipation part 162. The manifold 170, to which the cooling members 160 are connected, is mounted at the bottom of the battery cell assembly 120.

Each of the cooling members 160 is configured to have a structure in which the battery cells 110 are in tight contact with the opposite main surfaces of each of the cooling members 160, thereby maximizing cooling efficiency of the battery cells 110.

In addition, each frame is provided with depressed mount parts 129, in which the coolant inlet port 166 and the coolant outlet port 167 of the cooling member 160 are mounted, such that the cooling member 160 is stably fixed at a correct position.

An insulating member 180 is interposed between the front plate 132 and the battery cell assembly 120, and another insulating member 180 is interposed between the rear plate 136 and the battery cell assembly 120.

Each of the insulating members 180 includes a first insulating member 184 made of a foamed resin for shock absorption and a second insulating member 182 for insulation having a shape identical to the inner shape of the front plate 132 or the rear plate 136.

Meanwhile, a battery management system (BMS) 190 for controlling the operation of the battery module 100 is mounted at the top of the cover member 140.

FIG. 3 is an enlarged view showing one of the battery cells shown in FIG. 2.

Referring to FIG. 3, the battery cell 110 is a plate-shaped rectangular battery cell. The battery cell 110 is configured to have a structure in which an electrode assembly (not shown) is contained in a battery case 113 made of a laminate sheet together with an electrolyte, and outer edges 114 of the battery case 113 are sealed by thermal welding. Electrode tabs 111 and 112 are formed at one side of the battery case 113.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery module comprising:
a battery cell assembly having two or more battery cells laterally arranged;
a front plate and a rear plate respectively fixed to a front outermost battery cell and a rear outermost battery cell of the battery cell assembly such that the front plate and the rear plate surround the outermost battery cells of the battery cell assembly;
an electrically insulative cover member mounted at an upper end of the battery cell assembly, the cover member being provided with through holes, through which electrode terminals of the battery cells extend;
conductive connection parts arranged in a state in which the conductive connection parts are mounted at the cover member, the conductive connection parts being connected to the electrode terminals of the battery cells for detecting voltages of the battery cells while achieving electrical connection between the battery cells;
cooling members interposed between respectively adjacent ones of the battery cells such that each cooling member is in tight contact with the respectively adjacent ones of the battery cells, each of the cooling members being provided with coolant inlet and outlet ports each formed in a downward direction of the battery cell assembly and a coolant flow part in the cooling member having a hollow structure in which a coolant flows; and
a manifold, mounted directly under a bottom end of the battery cell assembly and connected to the cooling members via the coolant inlet and outlet ports, for moving the coolant in the coolant flow part,
wherein the front and rear plates and the cover member are oriented differently.

2. The battery module according to claim 1, wherein each of the battery cells is a pouch-shaped battery cell configured to have a structure in which an electrode assembly is mounted in a battery case made of a laminate sheet comprising a resin layer and a metal layer.

3. The battery module according to claim 1, wherein the battery cell assembly is configured to have a structure in which cartridges, to each of which a corresponding one of the battery cells is fixed, are stacked while being laterally arranged.

4. The battery module according to claim 3, wherein each of the cartridges is provided with fastening holes, through which fastening members for fixing the battery cell assembly are inserted.

5. The battery module according to claim 3, wherein each of the cartridges comprises a frame for fixing outer edge sealed portions of the battery cells located at opposite sides thereof.

6. The battery module according to claim 1, wherein the battery cell assembly is configured to have a structure in which the battery cells are arranged such that positive electrode terminals and negative electrode terminals of the battery cells protrude upward.

7. The battery module according to claim 1, wherein the conductive connection parts are coupled to the cover member in a state in which the conductive connection parts are arranged so as to correspond to the through holes of the cover member.

8. The battery module according to claim 1, further comprising:
a battery management system (BMS) for controlling an operation of the battery module, wherein the BMS is mounted at a top of the cover member.

9. The battery module according to claim 1, wherein the cover member is provided at an edge thereof with two or more fixing parts extending downward to surround upper parts of the front plate and the rear plate.

10. The battery module according to claim 1, wherein each of the cooling members is made of a metal material.

11. The battery module according to claim 1, wherein each of the cooling members comprises a plate-shaped heat dissipation part interposed between the battery cells in a state in which entire opposite main surfaces of the heat dissipation part and an adjacent battery cell are in tight contact with each other, a coolant flow part formed along an outer edge of the heat dissipation part, the coolant inlet port through which the coolant is introduced, and the coolant outlet port through which the coolant is discharged.

12. The battery module according to claim 11, wherein the coolant inlet port and the coolant outlet port are formed at one side of the heat dissipation part.

13. The battery module according to claim 1, wherein the coolant is water.

14. The battery module according to claim 5, wherein a first battery cell is mounted to one side of the frame in a state in which a corresponding one of the cooling members is interposed between the first battery cell and the frame, a second battery cell is mounted to the other side of the frame, and the first battery cell and the second battery cell are disposed in tight contact with opposite main surfaces of the cooling member.

15. The battery module according to claim 14, wherein the frame is provided with depressed mount parts, in which a coolant inlet port and a coolant outlet port of a corresponding one of the cooling members are mounted.

16. A battery module comprising:
a battery cell assembly having two or more pouch-shaped battery cells laterally arranged with respect to each other and each having a plate-shape;
a front plate and a rear plate fixed to outermost battery cells of the battery cell assembly such that the front plate and the rear plate surround the outermost battery cells of the battery cell assembly;
an electrically insulative cover member mounted at an upper end of the battery cell assembly, the cover member being provided with through holes, through which electrode terminals of the battery cells extend;
conductive connection parts arranged in a state in which the conductive connection parts are mounted at the cover member, the conductive connection parts being connected to the electrode terminals of the battery cells for detecting voltages of the battery cells while achieving electrical connection between the battery cells;
cooling members each having a plate-shape and being interposed between respectively adjacent ones of the battery cells such that opposite main surfaces of each cooling member is in tight contact with surfaces of the respectively adjacent ones of the battery cells, each of the cooling members being provided with coolant inlet and outlet ports each formed in a downward direction of the battery cell assembly and a coolant flow part in the cooling member having a hollow structure in which a coolant liquid flows;

a manifold mounted directly under a bottom end of the battery cell assembly and connected to the cooling members via the coolant inlet and outlet port for moving the coolant in the coolant flow part; and one or more insulating members interposed between the outermost battery cells of the battery cell assembly and the front plate and the rear plate, wherein each of the insulating members comprises a first insulating member made of a porous material and a second insulating member made of a sheet material.

17. The battery module according to claim 16, wherein the first insulating member is made of a foamed resin.

18. The battery module according to claim 16, wherein the first insulating member contacts a corresponding one of the outermost battery cells of the battery cell assembly, and the second insulating member contacts the front plate or the rear plate.

19. The battery module according to claim 18, wherein the sheet material of the second insulating member is formed in a shape identical to an inner shape of the front plate or the rear plate.

20. A high-output, large-capacity battery pack manufactured using a battery module according to claim 1 as a unit body.

21. A device comprising a battery pack according to claim 20.

22. The device according to claim 21, wherein the device is an electric vehicle, a hybrid electric vehicle, a plug-in hybrid electric vehicle, or a power storage device.

23. The battery module according to claim 7, the conductive connection parts are electrically connected to positive electrode terminals and negative electrode terminals of the battery cells through the through holes formed in the cover member.

* * * * *